United States Patent
Belen et al.

(10) Patent No.: US 11,905,709 B2
(45) Date of Patent: Feb. 20, 2024

(54) TRAPEZE HANGER BRACE ASSEMBLY (71) Applicant: ASC Engineered Solutions, LLC, Exeter, NH (US)

(72) Inventors: Jordan Cameron Belen, West Warwick, RI (US); Gregory Nicholas Stagliano Ohnemus, Providence, RI (US); Gregory Joseph Shaughnessy, Redlands, CA (US)

(73) Assignee: ASC Engineered Solutions, LLC, Portsmouth, NH (US)

( * ) Notice: Subject to any disclaimer, the term of this patent is extended or adjusted under 35 U.S.C. 154(b) by 0 days.

(21) Appl. No.: 17/586,216

(22) Filed: Jan. 27, 2022

(65) Prior Publication Data
US 2023/0235556 A1    Jul. 27, 2023

(51) Int. Cl.
*E04B 1/58* (2006.01)
*E04C 3/02* (2006.01)
*E04H 9/02* (2006.01)
*F16B 7/04* (2006.01)
*F16B 2/06* (2006.01)

(52) U.S. Cl.
CPC .............. *E04C 3/02* (2013.01); *E04H 9/02* (2013.01); *F16B 2/065* (2013.01); *F16B 7/0413* (2013.01); *E04B 2001/5868* (2013.01); *E04C 2003/026* (2013.01)

(58) Field of Classification Search
CPC ....... E04C 3/02; E04C 2003/026; E04H 9/02; F16B 2/065; F16B 7/0413; E04B 2001/5868
USPC ...... 52/713, 167.3, 167.1; 248/59, 317, 351, 248/62
See application file for complete search history.

(56) References Cited

U.S. PATENT DOCUMENTS

| 5,188,317 | A | 2/1993 | Roth |
| 6,273,372 | B1 * | 8/2001 | Heath ............... F16L 3/243 248/62 |
| 6,415,560 | B1 | 7/2002 | Rinderer |
| 6,421,965 | B2 | 7/2002 | Thompson et al. |
| 6,837,009 | B1 | 1/2005 | Roth |
| 7,654,043 | B2 | 2/2010 | Heath |
| 8,052,099 | B2 | 11/2011 | Heath |

(Continued)

FOREIGN PATENT DOCUMENTS

| EP | 3514429 | 7/2019 |
| WO | 2014178808 | 11/2014 |

OTHER PUBLICATIONS

Badger Industries; Specification sheet entitled: "Seismic Hardware Kits", publicly available prior to Jan. 27, 2022, 1 pg.

(Continued)

*Primary Examiner* — Brent W Herring
(74) *Attorney, Agent, or Firm* — Taylor English Duma, LLP (57) ABSTRACT

A brace assembly can include a structural member including a sidewall; and a bracket including a baseplate defining a slot extending from an open end to a closed end, the baseplate defining at least one baseplate hinge hole at the open end; a clamp including a jaw member and a tightening member, the jaw member and the tightening member engaging the sidewall to couple the structural member to the bracket, the jaw member defining a clamp hinge hole; and a hinge pin engaging the at least one baseplate hinge hole and the clamp hinge hole.

10 Claims, 7 Drawing Sheets

(56) References Cited

U.S. PATENT DOCUMENTS

| | | | |
|---|---|---|---|
| 9,163,422 B2 | 10/2015 | Heath | |
| 9,464,749 B2 | 10/2016 | Heath | |
| 9,777,870 B2* | 10/2017 | Roth | F16L 3/00 |
| 9,834,921 B2 | 12/2017 | Nehls | |
| 10,605,382 B2* | 3/2020 | Ohnemus | F16L 3/1091 |
| D977,326 S* | 2/2023 | Gunn | D8/354 |
| 2002/0023990 A1* | 2/2002 | Heath | B25B 5/006 |
| | | | 248/230.1 |
| 2004/0031887 A1* | 2/2004 | Heath | F16L 3/133 |
| | | | 248/62 |
| 2004/0031896 A1* | 2/2004 | Heath | F16B 2/06 |
| | | | 248/351 |
| 2005/0263746 A1* | 12/2005 | Carbajal | A47G 27/0493 |
| | | | 294/8.6 |
| 2006/0024127 A1* | 2/2006 | Heath | F16L 3/133 |
| | | | 403/150 |
| 2010/0107518 A1* | 5/2010 | Heath | E04H 9/0237 |
| | | | 52/167.3 |
| 2017/0336021 A1* | 11/2017 | Anderson | F16M 13/022 |
| 2020/0072393 A1* | 3/2020 | Ohnemus | F16B 2/10 |
| 2020/0284378 A1* | 9/2020 | Ohnemus | A62C 35/68 |
| 2020/0346323 A1 | 11/2020 | Gunn et al. | |
| 2021/0047854 A1 | 2/2021 | Witherbee et al. | |

OTHER PUBLICATIONS

Eaton; Specification Sheet for B633 Series—Adjustable Seismic Hinge Fitting, publicly available prior to Jan. 27, 2022, 1 pg.
Eaton; Specification Sheet for B650 Series—Seismic Retrofit Bracket, publicly available prior to Jan. 27, 2022, 1 pg.
Eaton; Specification Sheet for TOLCO Fig. 981—Fast Attach—Universal Swivel Sway Brace Attachment, publicly available prior to Jan. 27, 2022, 1 pg.
Eaton; Specification Sheet for TOLCO Fig. 985—Mechanical Fast Clamp, publicly available prior to Jan. 27, 2022, 1 pg.
Edmonton Fasteners & Tools Ltd; Article entitled: B-Line B650-1/2ZN, Seismic Retrofit Bracket, available at <https://edmfast.com/b-line-b650-1-2zn-seismic-retrofit-bracket/>, retrieved on Jul. 28, 2021, 5 pgs.
FM Approvals; Approval Guide, publicly available prior to Jan. 27, 2022, 4 pgs.
Nvent Caddy; Instruction Sheet for CSBR Retrofit Trapeze Attachment, publicly available prior to Jan. 27, 2022, 2 pgs.
Nvent Caddy; Specification Sheet for Trapeze Sway Brace, Pipe, publicly available prior to Jan. 27, 2022, 1 pgs.
Nvent Caddy; Specification Sheet for Trapeze Sway Brace, Strut, publicly available prior to Jan. 27, 2022, 1 pgs.
Unistrut; Article entitled: "Brace Fittings—Retrofit, Hinged", published Feb. 27, 2020, 1 pg.
Unistrut; Article entitled: "Brace Fittings—Retrofit, 45 degree Fixed Angle", published Feb. 27, 2020, 1 pg.
Unistrut; Article entitled: "Brace Fittings", publicly available prior to Jan. 27, 2022, 1 pg.

* cited by examiner

TRAPEZE HANGER BRACE ASSEMBLY

TECHNICAL FIELD

This disclosure relates to trapeze pipe hangers. More specifically, this disclosure relates to seismic braces for trapeze pipe hangers.

BACKGROUND

Pipes in buildings and other structures are commonly suspended below ceilings or roofs. One common form of pipe support is a trapeze hanger, which includes a crossmember suspended from two rods. The pipe can run between the two rods and be supported by the crossmember. Trapeze hangers can be unstable under lateral loading conditions. Seismic events, such as earthquakes, can impose lateral loads on trapeze hangers, which can result in damage to the hangers or the pipes supported by the hangers.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a brace assembly comprising a structural member comprising a sidewall; and a bracket comprising a baseplate defining a slot extending from an open end to a closed end, the baseplate defining at least one baseplate hinge hole at the open end; a clamp comprising a jaw member and a tightening member, the jaw member and the tightening member engaging the sidewall to couple the structural member to the bracket, the jaw member defining a clamp hinge hole; and a hinge pin engaging the at least one baseplate hinge hole and the clamp hinge hole.

Also disclosed is a pipe trapeze assembly comprising a pipe trapeze comprising a crossmember, at least one rod, and at least one fastener, the fastener threadedly engaging with the at least one rod, the crossmember coupled to the at least one rod; and a brace assembly comprising a structural member; and a bracket coupled to the structural member, the bracket comprising a baseplate defining a slot extending from an open end to a closed end of the baseplate, the rod extending through the slot, the slot defining a rounded end where the slot terminates at the closed end, the baseplate defining a countersink coaxially centered with the rounded end, the fastener positioned within the countersink.

Also disclosed is a method for bracing a pipe trapeze with a brace assembly, the method comprising sliding a slot of a baseplate of the brace assembly onto a rod of the pipe trapeze through an open end of the baseplate until the rod is positioned at a slot end of the slot, the rod fixed to and suspending a crossmember of the pipe trapeze, the slot extending from the open end of the baseplate towards a closed end of the baseplate, the slot end defined where the slot terminates at the closed end; coupling the baseplate to a structural member of the brace assembly; and tightening a fastener against the baseplate to secure the baseplate relative to the crossmember and the rod, the fastener threadedly engaged with the rod Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a pipe trapeze assembly and associated methods, systems, devices, and various apparatus. The pipe trapeze assembly can comprise a pipe trapeze and at least one brace assembly. It would be understood by one of skill in the art that the disclosed pipe trapeze assembly is described in but a few exemplary aspects among many. No particular terminology or description should be considered limiting on the disclosure or the scope of any claims issuing therefrom.

Figure 1:
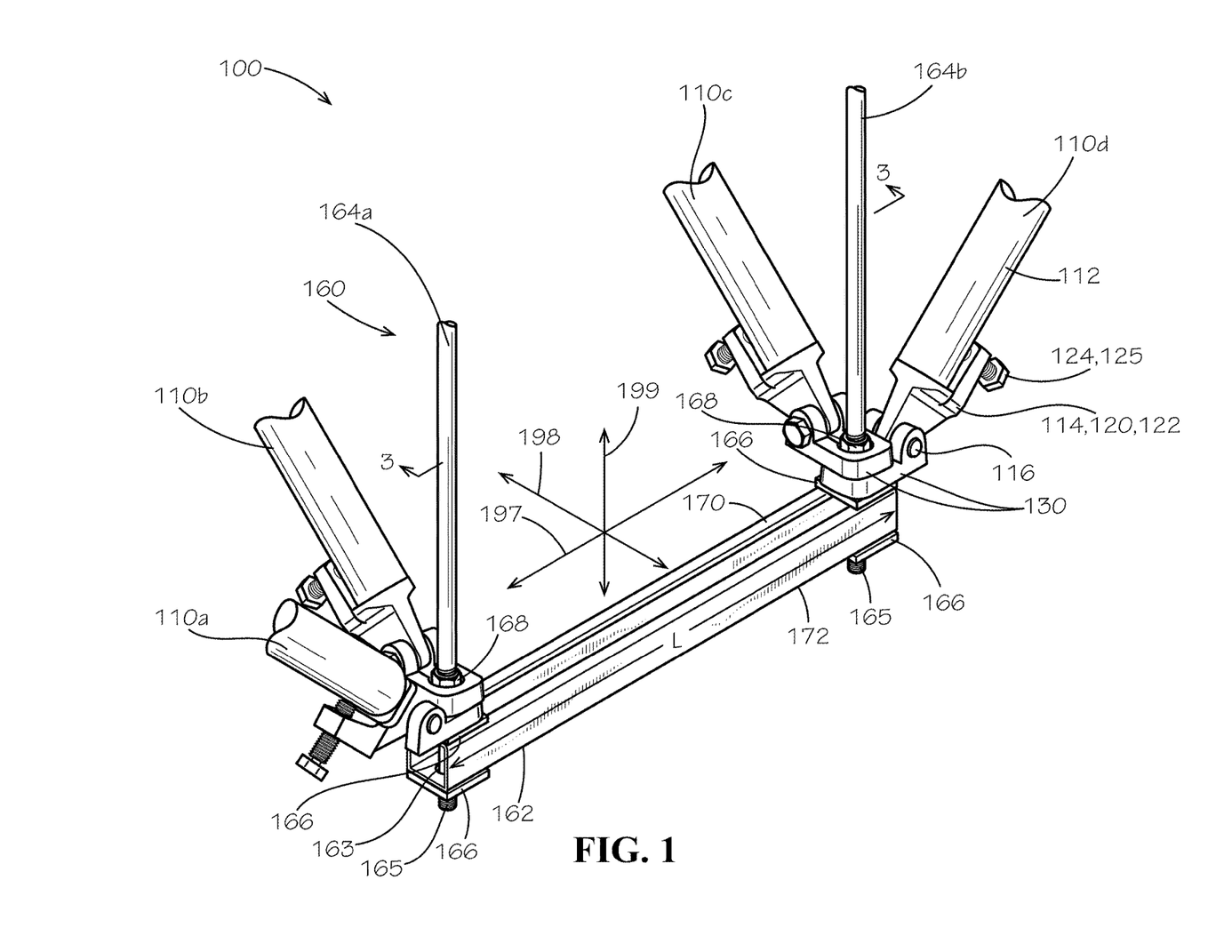
FIG. 1 is a perspective view of a pipe trapeze assembly comprising a pipe trapeze and four brace assemblies in accordance with one aspect of the present disclosure.

FIG. 1 shows a perspective view of a pipe trapeze assembly 100 comprising a pipe trapeze 160 and at least one brace assembly 110. In the aspect shown, the pipe trapeze assembly 100 can comprise four brace assemblies 110a,b,c,d (referred to generally as "the brace assembly 110" or "the brace assemblies 110"). Each brace assembly 110a,b,c,d can extend off the page.

The pipe trapeze 160 can comprise a crossmember 162 and two rods 164a,b. Each of the rods 164a,b can extend off the page to mount to a structure, such as a ceiling, overhead beam, joist, or other suitable structure, for example and without limitation. In the aspect shown, the rods 164a,b can suspend the crossmember 162. The rods 164a,b can extend in a substantially vertical orientation. The crossmember 162 can extend in a substantially horizontal orientation. The rods 164a,b can be substantially perpendicular to the crossmember 162. The rods 164a,b can extend through openings 163 in the crossmember 162, as demonstrated by the rod 164a. The openings 163 can be holes, slots, or any other type of opening. The crossmember 162 can comprise a channel, beam, bar, tube, angle, or other type of material stock for example and without limitation. The crossmember 162 can comprise a metal, such as iron, steel, aluminum, or any other suitable metal or alloy. In some aspects, the crossmember 162 can comprise a different material, such as a polymer, composite, or other suitable material. In the aspect shown, the crossmember 162 can be a piece of channel.

As demonstrated by the brace assembly 110d, each brace assembly 110 can comprise a structural member 112 and a bracket 114. The bracket 114 can be coupled to the structural member 112. In the present aspect, the structural member 112 can be a tubular member, such as a pipe or tube. In aspects utilizing tubes, the tubes can be round or other shapes, such as rectangular for example and without limitation. In some aspects, the structural member 112 can be a channel, beam, bar, angle, or other type or shape of material stock.

The bracket 114 can comprise a clamp 120 and a baseplate 130. The clamp 120 can comprise a jaw member 122 and a tightening member 124. The tightening member 124 can be a fastener, such as a screw for example and without limitation. The tightening member 124 can threadedly engage with the jaw member 122. The tightening member 124 can be tightened, or screwed into, the jaw member 122 to pinch a portion of the structural member 112 between the jaw member 122 and the tightening member 124.

In some aspects, the tightening member 124 can be designed to include a shear-off head 125. The head of the tightening member 124, such as a hex-head, can be designed to shear from the remainder of the tightening member 124 at a specified torque. The shear-off head 125 can simplify installation by providing feedback to an assembler that the tightening member 124 has been sufficiently tightened without requiring a calibrated tool, such as a torque wrench. The shear-off head 125 can also prevent an assembler from overtightening the tightening member 124. Because the head shears off, tampering with the tightening member 124 can be prevented, such to stop a person from loosening the tightening member 124. Additionally, the absence of the head on the tightening member 124 can provide quick visual confirmation that the tightening member 124 has been properly tightened. For example, a worker standing on the floor can look upwards towards brace assemblies 110 suspended from a ceiling and visually confirm that the tightening member 124 has been properly tightened based on the absence of the shear-off head 125 without requiring access to the tightening member 124, such as by climbing a ladder.

The clamp 120 can be hingedly coupled to the baseplate 130 by a hinge pin 116. The hinge pin 116 can be a fastener, such as a bolt, screw, rivet, pin, stud, nut, or other suitable type of fastener or combinations thereof. In the aspect shown, the hinge pin 116 can be a screw, which can threadedly engage the baseplate 130. The baseplate 130 of each brace assembly 110 can fit around one of the rods 164a,b. As demonstrated by brace assemblies 110c,d and the rod 164b, multiple baseplates 130 can be fit around each rod 164a,b, and the baseplates 130 can be stacked atop one another.

The pipe trapeze 160 can further comprise reinforcement plates, or backing plates, 166 and fasteners 168. The backing plates 166 can be positioned in contact with both a top side 170 and a bottom side 172 of the crossmember 162. The fasteners 168 can be positioned both above and below (fasteners 168 shown below the crossmember 162 and backing plates 166 in FIG. 3) the backing plates 166. The crossmember 162 can be positioned between the backing plates 166, and the backing plates 166 can be positioned between the fasteners 168 of a given rod 164a,b. In the present aspect, the rods 164a,b can be at least partially threaded, such as with external threading 165 for example and without limitation, and the fasteners 168 can be nuts, which can threadedly engage with the rods 164a,b. The fasteners 168 can be tightened towards one another on the respective rod 164a,b to clamp the baseplates 130 to the top backing plate 166 and the backing plates 166 to the top side 170 and the bottom side 172 of the crossmember 162.

A lateral direction 197 can be defined in a direction extending horizontally between the rods 164a,b. A length L of the crossmember 162 can be oriented parallel to the lateral direction 197. A longitudinal direction 198 can be defined extending horizontally in a direction perpendicular to the lateral direction 197 and the length L of the crossmember 162. A vertical direction 199 can be perpendicular to each of the lateral direction 197 and the longitudinal direction 198 and aligned with the acting direction of the force of gravity.

Each brace assembly 110 can be rotationally indexed around the respective rods 164a,b prior to tightening the fasteners 168. Tightening the fasteners 168 can secure the brace assemblies 110 so that the respective brace assemblies 110 are rotationally fixed about the respective rods 164a,b. As described below in greater detail, the baseplates 130 can interlock when stacked to secure the brace assemblies 110 attached to the same rod 164a,b in a set orientation relative to one another. In the aspect shown, the structural members 112 of brace assemblies 110a,d can extend laterally outward and vertically upward from the crossmember 162, with respect to the lateral direction 197 and the vertical direction 199. The structural members 112 of brace assemblies 110b,c can extend longitudinally outward and vertically upward from the crossmember 162, with respect to the longitudinal direction 198 and the vertical direction 199.

Figure 3:
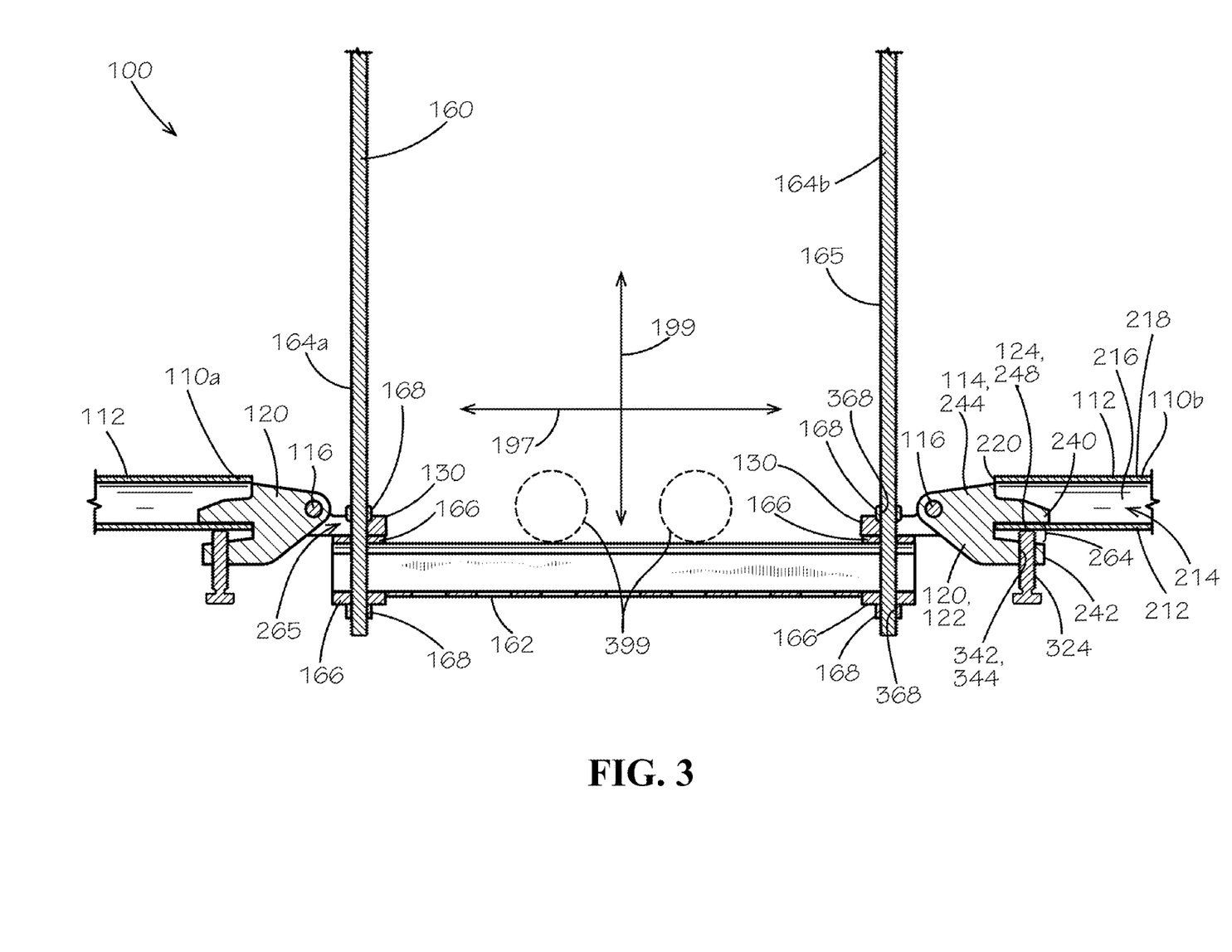
FIG. 3 is a cross-sectional view of another aspect of the pipe trapeze assembly, taken along line 3-3 shown in FIG. 1, comprising two brace assemblies in accordance with another aspect of the present disclosure.
Figure 6:
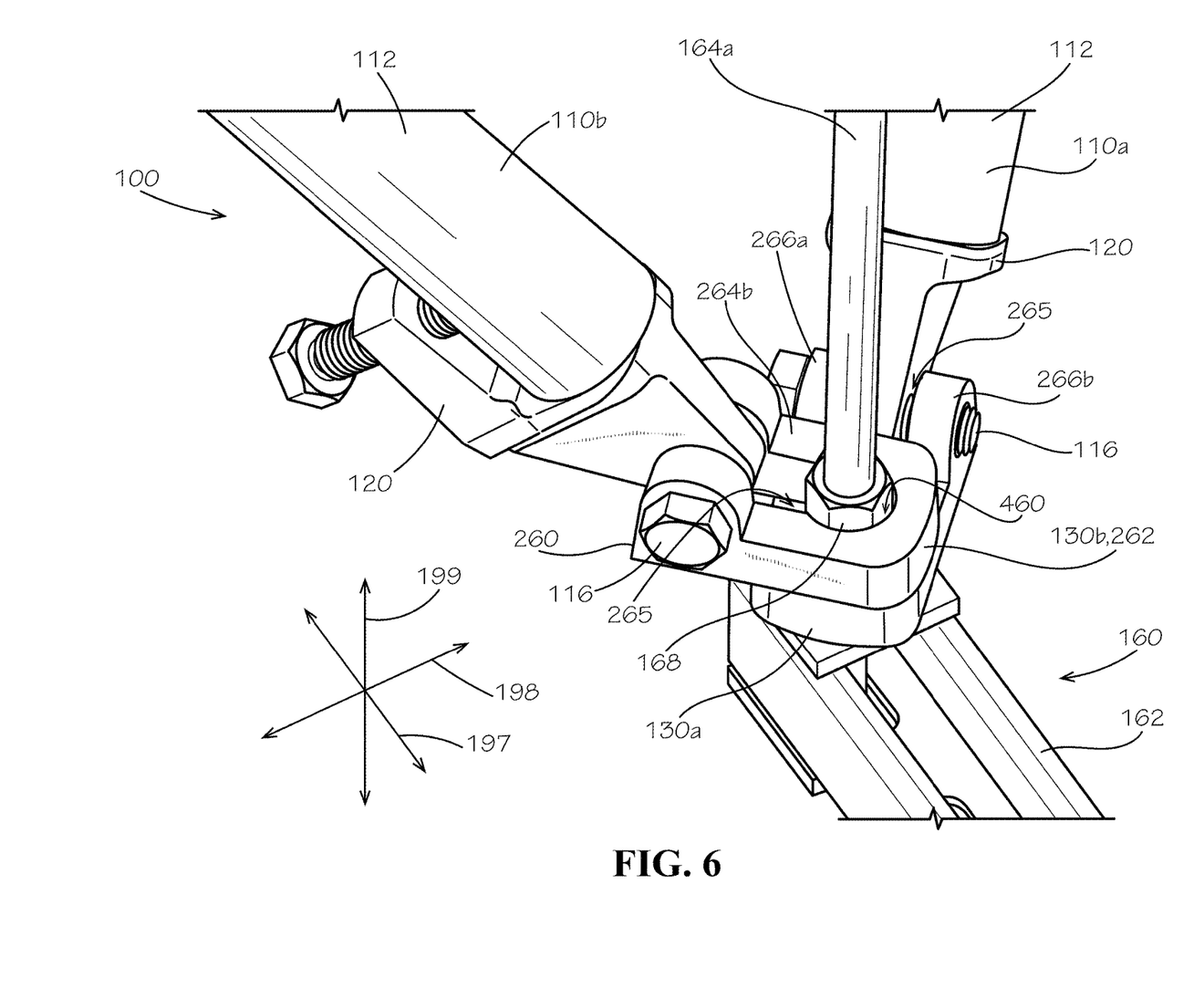
FIG. 6 is a detailed top perspective view of another aspect of the pipe trapeze assembly in accordance with another aspect of the present disclosure.
Figure 7:
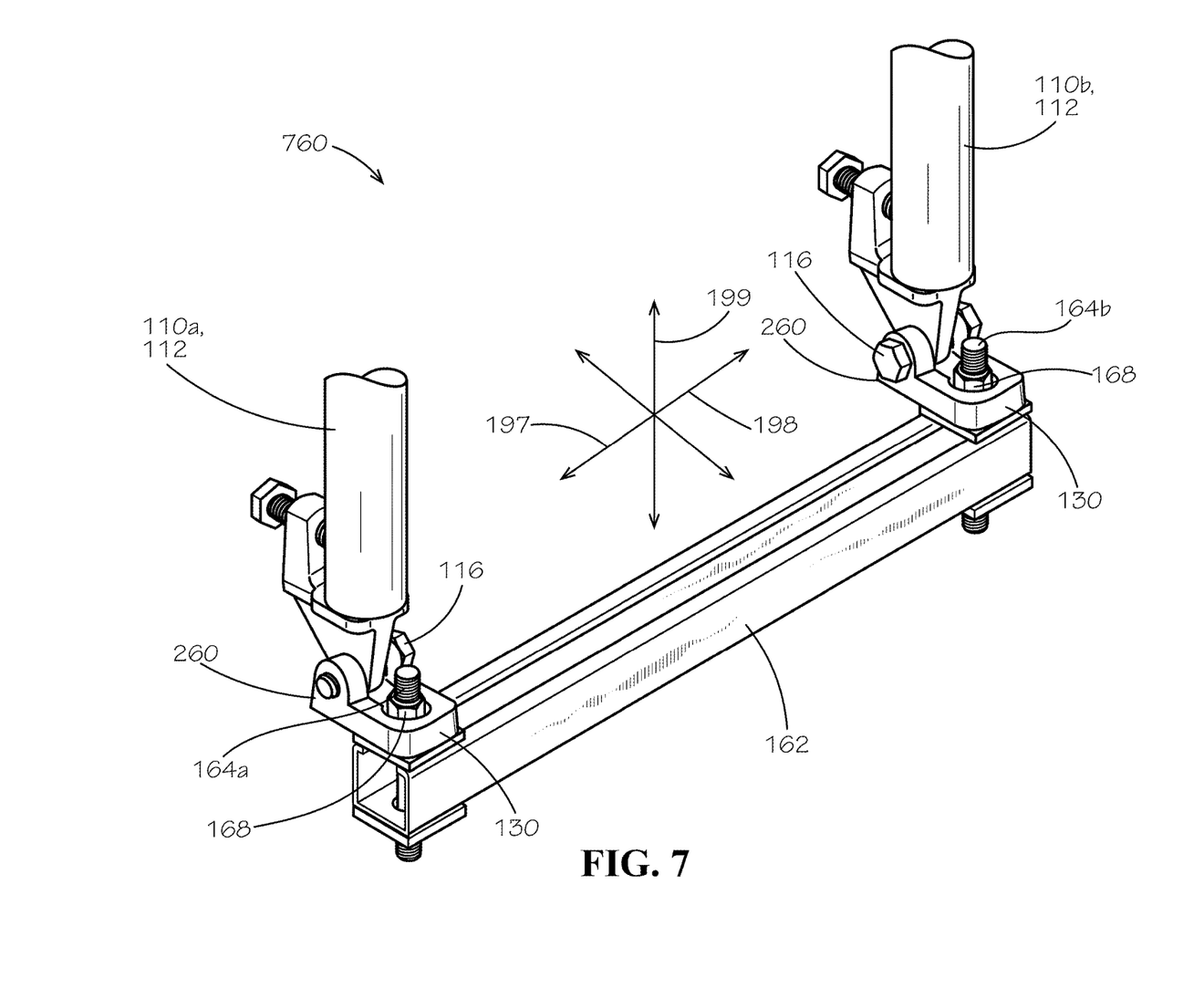
FIG. 7 is a perspective view of another aspect of the pipe trapeze in accordance with another aspect of the present disclosure.

The hinge pins 116 can also provide a range of angles of the structural members 112 and the clamps 120 relative to the respective baseplates 130. In some aspects, the structural members 112 and the clamps 120 can rotate over 180-degrees relative to the respective baseplates 130. For example and without limitation, the structural members 112 can be horizontally oriented, as shown in FIG. 3, vertically oriented, as shown in FIG. 7, or diagonally oriented as shown in FIGS. 1 and 6. In some aspects, the hinge pin 116 can be tightened to secure the structural members 112 and the clamps 120 at a specific angle relative to the baseplate 130. In some aspects, the hinge pin 116 can be a screw that can threadedly engage the baseplate 130, and the screw can be tightened to the baseplate 130. In some aspects, the hinge pin 116 can be a nut and bolt, which can be tightened together.

Figure 2:
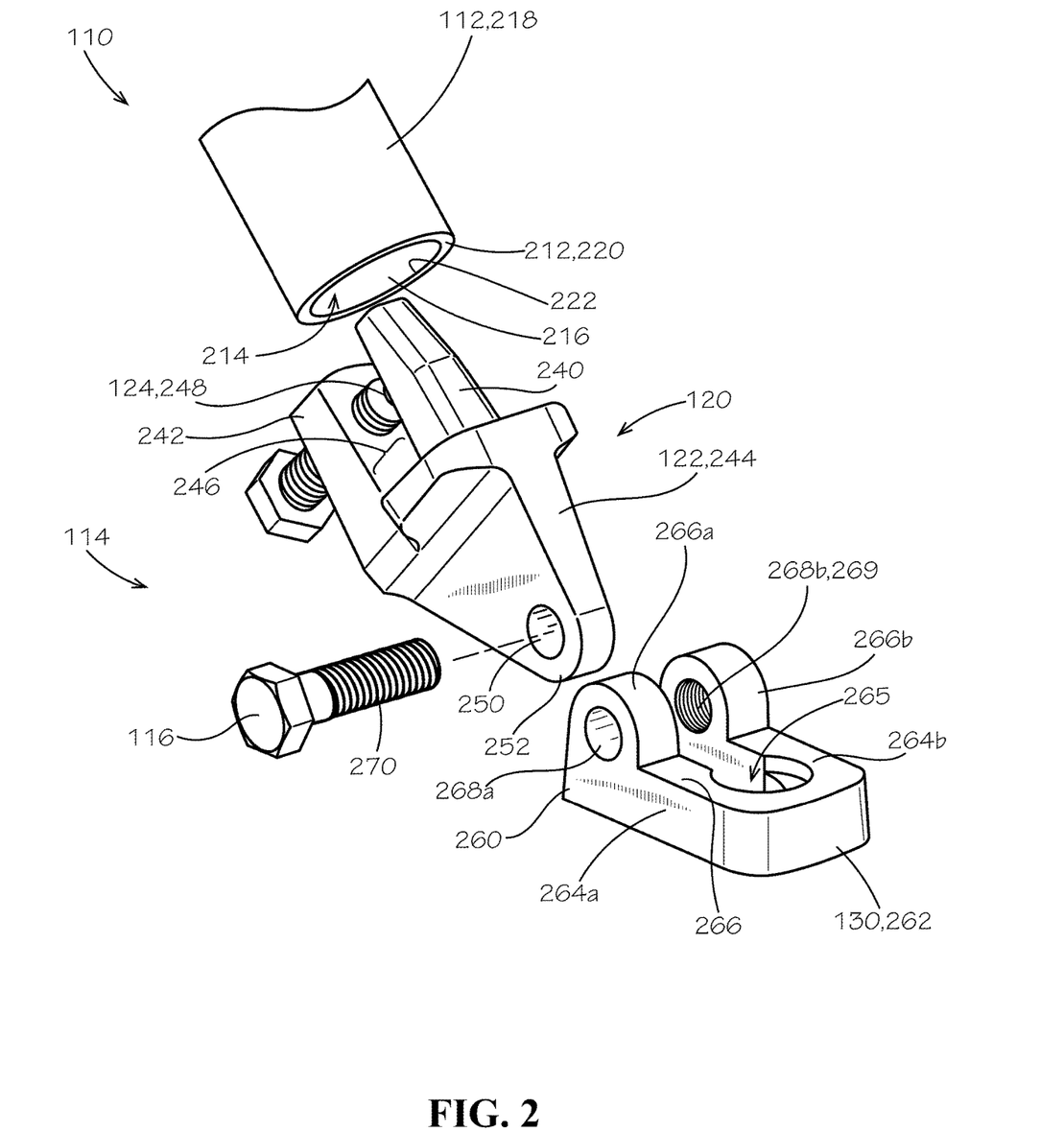
FIG. 2 is an exploded view of one of the brace assemblies of FIG. 1.

FIG. 2 is an exploded view of one of the brace assemblies 110 of FIG. 1. The structural member 112 can comprise a sidewall 212, which can define a bore 214 extending through the structural member 112. Specifically, the bore 214 can be defined by an inner surface 216 of the structural member 112, and the structural member 112 can define an outer surface 218 on a opposite side of the sidewall 212. An end 220 of the structural member 112 can define an opening 222 to the bore 214.

The jaw member 122 of the clamp 120 can define a jaw 240, a tightening arm 242, and a base 244. The jaw 240 and the tightening arm 242 can each be connected to and protrude from the base 244. The jaw 240 and the tightening arm 242 can extend in substantially the same direction from the base 244. A hinge end 252 of the jaw member 122 can be defined opposite from the jaw 240 and the tightening arm 242. In some aspects, at least one surface of the base 244 can be parallel to at least one surface of the tightening arm 242. A gap 246 can be defined between the jaw 240 and the tightening arm 242.

The tightening member 124 can extend through the tightening arm 242. The tightening member 124 can threadedly engage with the tightening arm 242. The tightening member 124 can be rotated to drive a tip 248 of the tightening member 124 into the gap 246 and towards the jaw 240 or out from the gap 246 and away from the jaw 240. The hinge end 252 of the base 244 can define a clamp hinge hole 250, which can be sized to receive the hinge pin 116.

The baseplate 130 can comprise two legs 264a,b connected by a closed end 262. An open end 260 can be defined opposite from the closed end 262 by the legs 264a,b. The baseplate 130 can define a U-shape, or a horseshoe shape, for example and without limitation. A slot 265 can be defined between the legs 264a,b extending from the open end 260 towards the closed end 262.

The closed end 262 and portions of the legs 264a,b adjacent to the closed end 262 can define an upper surface 266. The legs 264a,b can respectively define a pair of ears 266a,b at the open end 260. The ears 266a,b can extend upwards from the upper surface 266. The hinge end 252 of the base 244 can be sized to fit between the ears 266a,b and at least partially into the slot 265 through the open end 260.

The ears 266a,b can each define a baseplate hinge hole 268a,b, respectively. The baseplate hinge hole 268a can be a smooth hole. The baseplate hinge hole 268b can be a threaded hole. In some aspects, the baseplate hinge hole 268a can be larger in diameter than the baseplate hinge hole 268b. In some aspects, both hinge holes 268a,b can be smooth holes.

The hinge pin 116 can be inserted through the baseplate hinge hole 268a, the clamp hinge hole 250, and a threaded portion 270 of the hinge pin 116 can threadedly engage with internal threading 269 of the baseplate hinge hole 268b to hingedly couple the clamp 120 to the baseplate 130. In some aspects, tightening the hinge pin 116 can pinch the ears 266a,b closer together, and the baseplate 130 can grip the hinge end 252 of the base 244 to secure the clamp 120 at a set angle relative to the baseplate 130, thereby preventing rotation of the clamp 120 relative to the baseplate 130 about the hinge pin 116.

FIG. 3 is a cross-sectional view of another aspect of the pipe trapeze assembly 100, taken along line 3-3 of FIG. 1, comprising the pipe trapeze 160 of FIG. 1 and two brace assemblies 110a,b, in accordance with another aspect of the present disclosure.

In the aspect shown, each clamp 120 can be pivoted about the respective hinge pin 116 relative to the respective baseplate 130 so that the structural members 112 extend horizontally outwards without extending upwards or downwards relative to the vertical direction 199. In the aspect shown, the structural members 112 can extend outwards in the lateral direction 197.

The fasteners 168 can couple the baseplates 130 to the crossmember 162. As demonstrated by the rod 164b, the fasteners 168 can define internal threading 368, which can threadedly engage with the external threading 165 of each rod 164a,b. In the aspect shown, the rod 164b can define the external threading 165 along its entire length, for example and without limitation. Specifically, the fasteners 168 can secure the baseplate 130 to the top backing plate 166 and secure the backing plates 166 to the top and bottom of the crossmember 162. As demonstrated by the brace assembly 110a and the rod 164a, each rod 164a,b can extend through the slot 265 (shown bisected in the present view).

One or more runs of piping 399 can be supported on the crossmember 162, which in turn can be suspended by the rods 164a,b. The piping 399 can extend in the longitudinal direction, which can extend into and out from the page with respect to the present viewing angle (longitudinal direction 198 also shown in FIG. 1).

As demonstrated by the clamp 120 of the brace assembly 110b, the clamp 120 can grip a portion of the sidewall 212 of the structural member 112. The jaw 240 can extend through the opening 222 (shown in FIG. 2) and into the bore 214, and the end 220 can abut the base 244 of the jaw member 122. The jaw 240 can engage with the inner surface 216 of the structural member 112. The tip 248 of the tightening member 124 can engage with the outer surface 218 of the structural member 112. In some aspects, the tip 248 can penetrate or deform the sidewall 212.

The tightening member 124 can define external threading 324, which can threadedly engage with internal threading 342 within a bore 344 of the tightening arm 242. By rotating the tightening member 124, the tip 248 can be driven into the gap 264 until the tip 248 engages with the sidewall 212 and pinches the sidewall 212 between the jaw 240 and the tip 248.

As similarly noted above, in some aspects, the structural member 112 may not be a tubular member. In aspects wherein the structural member 112 defines a different shape, the jaw 240 and the tip 248 of the tightening member 124 can engage with a different part of the structural member 112, such as a web, flange, or sidewall portion as seen in beams, angled shapes, channels, bars of various profiles, and other shaped stock, for example and without limitation.

Figure 4:
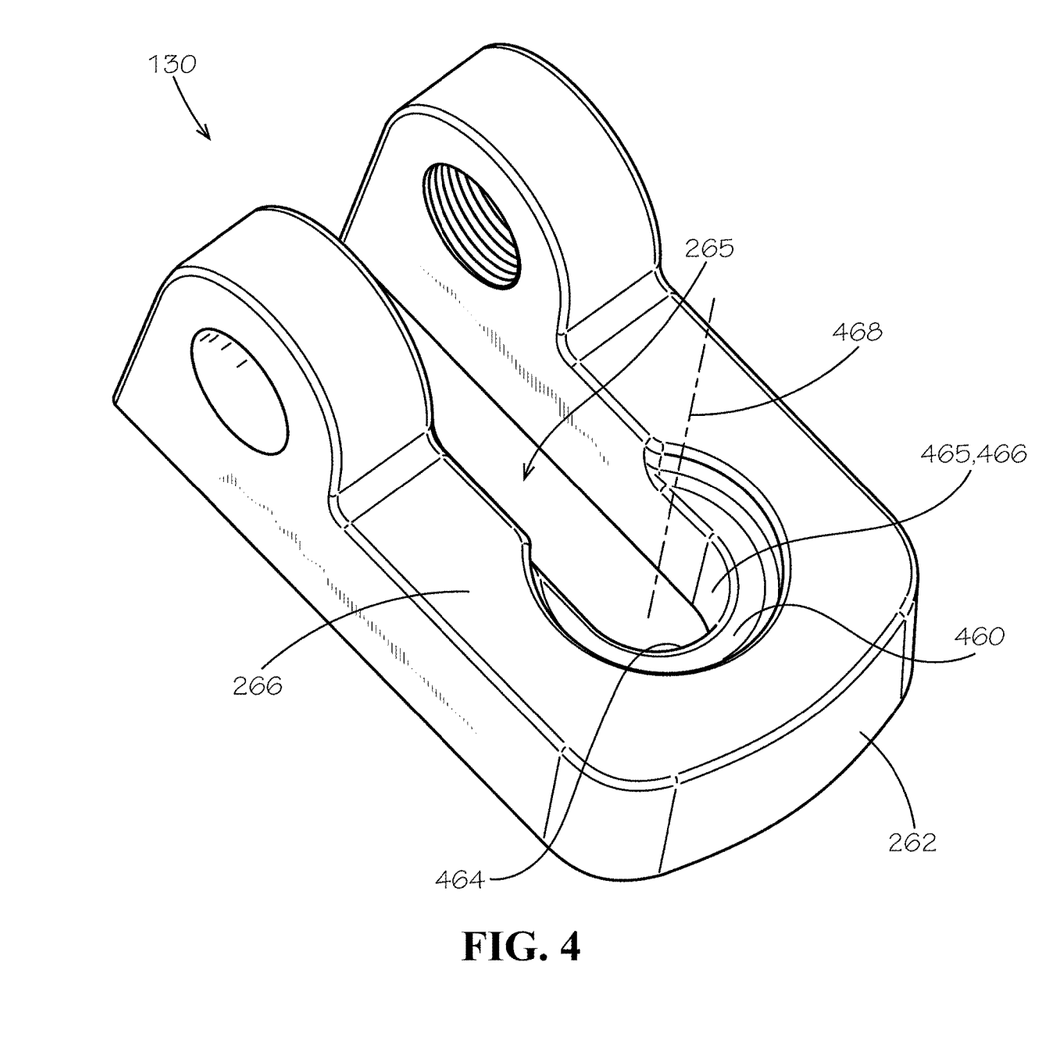
FIG. 4 is a top perspective view of a baseplate of one of the brace assemblies of FIG. 1.

FIG. 4 is a top perspective view of the baseplate 130 of FIG. 1. The slot 265 can define a slot end 464 where the slot 265 terminates at the closed end 262. The upper surface 266 can be substantially planar. A countersink 460 can be recessed below the upper surface 266 at the slot end 464. The slot end 464 can define a rounded end 465 with an axis 468. In some aspects, the rounded end 465 can define a frustoconical portion 466. In some aspects, the rounded end 465 can define a cylindrical portion. The countersink 460 can be coaxially centered around the rounded end 465 about the axis 468. The countersink 460 can be substantially circular in shape.

Figure 5:
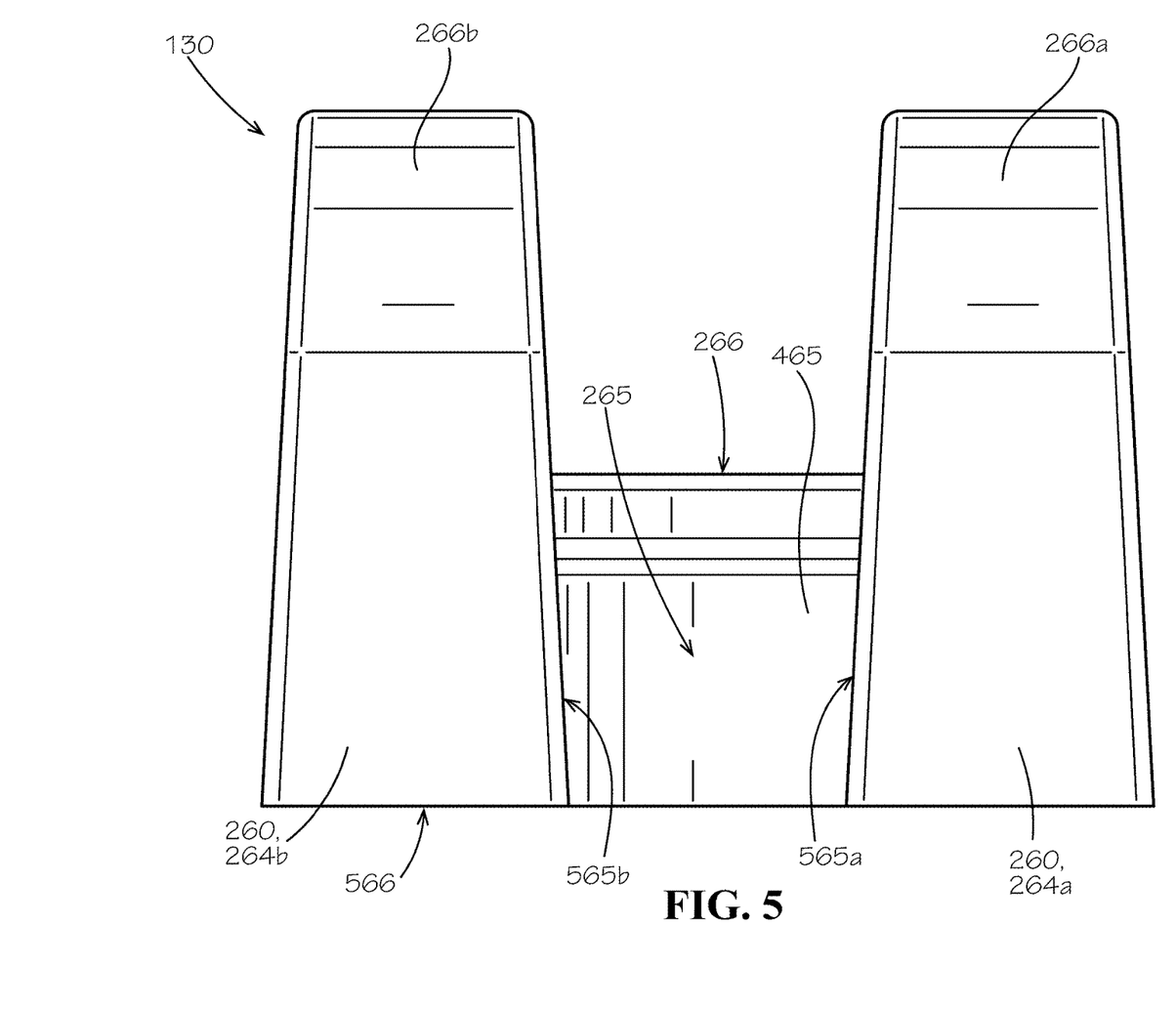
FIG. 5 is rear view of an open end of the baseplate of FIG. 4.

FIG. 5 is a rear view of the open end 260 of the baseplate 130 of FIG. 1. The baseplate 130 can define a lower surface 566 opposite from the upper surface 266. The lower surface 566 can be substantially parallel to the upper surface 266. The slot 265 can extend through the baseplate 130 from the upper surface 266 to the lower surface 566. The slot 265 can define a pair of side surfaces 565a,b extending from the open end 260 to the rounded end 465. The side surface 565a can be defined by the leg 264a, and the side surface 565b can be defined by the leg 264b. The side surfaces 565a,b can slope towards each other from the upper surface 266 to the lower surface 566, such that the slot 265 can be narrower where the slot 265 meets the lower surface 566 compared to where the slot 265 meets the upper surface 266. The slot 265 can narrow from the upper surface 266 towards the lower surface 566. As shown, the ears 266a,b can taper, or become narrower, as the ears 266a,b extend away from the lower surface 566.

FIG. 6 is a detailed top perspective view of the pipe trapeze assembly 100 showing the brace assemblies 110a,b, the rod 164a, and the crossmember 162 of the pipe trapeze 160.

The brace assemblies 110a,b are shown in another rotational orientation relative to the crossmember 162. In the orientation shown, each of the structural members 112 of the brace assemblies 110a,b can extend both laterally and longitudinally outward from the crossmember 162, with respect to the lateral direction 197 and the longitudinal direction 198. The structural members 112 can also extend upwards from the crossmember 162 with respect to the vertical direction 199.

With respect to FIG. 6, a baseplate 130a can refer to the baseplate of the brace assembly 110a, and a baseplate 130b can refer to the baseplate of the brace assembly 110b. As demonstrated by the baseplate 130b, the fastener 168 can sit in the countersink 460, which can secure the rod 164a relative to the baseplate 130b. For example and without limitation, engagement between the fastener 168 and the countersink 460 can prevent the rod 164a from sliding along the slot 265 towards the open end 260. The rod 164a can be secured at the rounded end 465 (shown in FIG. 4), which can be shaped to closely fit the rod 164a.

The baseplates 130a,b can be shaped and sized so that the rounded ends 465 can be aligned together when the baseplates 130a,b are stacked on top of each other. For example, the axis 468 (shown in FIG. 4) of the respective rounded ends 465 can be aligned together as well as with the rod 164a. As similarly described above, engagement between the fastener 168 and the countersink 460 can secure the rod 164a at the rounded end 465 of the baseplate 130b. The sizing of the baseplates 130a,b can cooperate to secure the rod 164a at the rounded end 465 of the baseplate 130a.

Specifically, the leg 264b of the baseplate 130b can engage with the ears 266a,b of the baseplate 130a to secure the rod 164a at the rounded end 465 of the baseplate 130a. For example, a width of the leg 264b can be sized to space the rod 164a sufficiently far from the ears 266a,b to position and secure the rod 164a at the rounded end 465 of the baseplate 130a. The shape and sizing of the leg 264b and the ears 266a,b can also be configured to interlock the baseplates together, thereby preventing relative rotation of the baseplates 130a,b relative to one another and securing the baseplates 130a,b in a set orientation relative to one another. In the aspect shown, the set orientation can be a perpendicular orientation relative to one another. For example and without limitation, the slots 265 of the respective baseplates 130a,b can be offset 90-degrees from one another.

Similarly, in some aspects, the closed end 262 of the top baseplate 130b can be positioned against the ears 266a,b of the bottom baseplate 130a to interlock the baseplates 130a,b together, thereby preventing rotation of the baseplates 130a,b relative to one another. The shape and size of ears 266a,b and the closed end 262 can be configured to interlock and secure the baseplates 130a,b in another set orientation, such as a parallel orientation wherein the slots 265 can be 180-degree offset from one another. The closed end 262 and the ears 266a,b can be sized to secure the rod 164a at the rounded end 465 of each baseplate 130a,b when stacked in the 180-degree offset orientation. For example, a width of the closed end 262 can be sized to space the rod 164a sufficiently far from the ears 266a,b to position and secure the rod 164a at the rounded end 465 of the lower baseplate 130a.

In common applications, the rods 164a,b (rod 164b shown in FIG. 1) of the pipe trapeze 160 can primarily support, such as by suspending, the crossmember 162 and any pipes supported by it, such as the piping 399 (shown in FIG. 3), in the vertical direction 199. Due to their length and connection mechanism, the rods 164a,b typically offer high flexibility in the lateral direction 197 and particularly the longitudinal direction 198, and pipe trapezes 160 are frequently utilized where longitudinal expansion of piping is expected, such as piping runs experiencing substantial variations in pressure and/or temperature, for example and without limitation.

In the occurrence of a seismic event, the crossmember 162 and the piping supported by it may move excessively if unbraced. The brace assemblies 110a,b,c,d can provide support in the lateral direction 197 and/or the longitudinal direction 198. The brace assemblies 110a,b,c,d (brace assemblies 110c,d shown in FIG. 1) can offer the greatest support in directions parallel with or at least partially aligned with the structural member 112 of each brace assembly 110a,b,c,d. For example and without limitation, a brace assembly 110 oriented with a structural member 112 extending laterally outward from the crossmember 162 or laterally outward and vertically upward from the crossmember 162 can provide the greatest support in the lateral direction 197 but limited support in the longitudinal direction 198. A brace assembly 110 oriented with a structural member 112 extending longitudinally outward from the crossmember 162 or longitudinally outward and vertically upward from the crossmember 162 can provide the greatest support in the longitudinal direction 198 but limited support in the lateral direction 197. When the pipe trapeze 160 deflects horizontally, the tapered shape of the slot 265 (shown in FIG. 5) and the frustoconical portion 466 (shown in FIG. 4) can cooperate to provide clearance for the rods 164a,b to deflect from the vertical direction relative to the baseplates 130 without the brace assemblies 110 exerting bending moments on the rods 164a,b, which could potentially damage the rods 164a,b.

In some applications, one or more brace assemblies 110a,b can be retrofitted to an existing pipe trapeze 160. For example and without limitation, the top, or upper, fastener 168 can be rotated up the respective rod 164a,b and away from the crossmember 162 to provide clearance to slip one or more baseplates 130 over the respective rod 164a,b. The fastener 168 can be tightened against the one or more baseplates 130a,b to secure the orientation of each baseplate 130a,b relative to the crossmember 162. Hinge pins 116 can be inserted to secure the baseplates 130a,b to the respective clamps 120 and structural members 112 (shown in FIG. 1) to assemble the brace assemblies 110. Similarly, additional brace assemblies 110a,b can be added to or removed from the existing pipe trapeze 160 without disassembling the pipe trapeze 160. For example and without limitation, one, two, three, four, or more brace assemblies 110 can be secured to the same rod 164.

FIG. 7 shows another aspect of a pipe trapeze 760. In the aspect shown, the crossmember 162 can be supported in the vertical direction 199 by the brace assemblies 110a,b. The rods 164a,b and fasteners 168 can couple the brace assemblies 110a,b to the crossmember 162. The brace assemblies 110a,b can extend upwards and off the page, where the brace assemblies 110a,b can mount to a structure, such as a ceiling, overhead beam, joist, or other suitable structure, for example and without limitation. In the aspect shown, the rods 164a,b do not provide vertical support to the crossmember 162. In some aspects, the rods 164a,b can be bolts, rivets, screws, or any other suitable fasteners or combinations thereof.

In the orientation shown, the baseplates 130 can offset the structural members 112 in the longitudinal direction 198, relative to the crossmember 162 and the rods 164a,b. For example, the open ends 260 of the baseplates 130 can face in the longitudinal direction 198, which can position the hinge pins 116 and structural members 112 longitudinally outward from the crossmember 162 and the rods 164a,b. In some aspects, the baseplates 130 can offset the structural members 112 in the lateral direction 197, relative to the crossmember 162 and the rods 164a,b. As one example, the open ends 260 of the baseplates 130 can face away from one another, which can position the hinge pins 116 and the structural members 112 laterally outward from the crossmember 162 and the rods 164a,b. As a second example, the open ends 260 of the baseplates 130 can be positioned facing one another, which can position the hinge pins 116 and the structural members 112 laterally inward from the rods 164a,b.

In the aspect shown, the structural members 112 are shown extending upwards from the crossmember 162 substantially parallel to the vertical direction 199. In some aspects, the structural members 112 can support the crossmember 162 while extending vertically upward as well as longitudinally outward, laterally outward, or both longitudinally and laterally outward, relative to the lateral direction 197, the longitudinal direction 198, and the vertical direction 199. In some aspects, the pipe trapeze 760 can comprise more than two brace assemblies 110a,b.

Various methods for using the brace assembly 110 to brace the pipe trapeze 160 are contemplated. In some aspects, a method for bracing a pipe trapeze with a brace assembly can comprise sliding a slot of a baseplate of the brace assembly onto a rod of the pipe trapeze through an open end of the baseplate until the rod is positioned at a slot end of the slot, the rod fixed to and suspending a crossmember of the pipe trapeze, the slot extending from the open end of the baseplate towards a closed end of the baseplate, the slot end defined where the slot terminates at the closed end; coupling the baseplate to a structural member of the brace assembly; and tightening a fastener against the baseplate to secure the baseplate relative to the crossmember and the rod, the fastener threadedly engaged with the rod.

In some aspects, tightening the fastener against the baseplate can comprise positioning the fastener in a countersink of the baseplate, and the countersink can be centered around the slot end. In some aspects, coupling the baseplate to the structural member can comprise inserting a hinge pin through the baseplate and through a clamp of the brace assembly to hingedly couple the baseplate to the clamp, and the clamp can be coupled to the structural member. In some aspects, inserting the hinge pin through the baseplate and through the clamp to hingedly couple the baseplate to the clamp can comprise: inserting the hinge pin through a first baseplate hinge hole of the baseplate, the first baseplate hinge hole defined by a first ear of the baseplate at the open end; inserting a portion of the clamp into the slot at the open end; inserting the hinge pin through a clamp hinge hole of the clamp; and threadedly engaging the hinge pin with a second baseplate hinge hole of the baseplate, the second baseplate hinge hole defined by a second ear of the baseplate at the open end, the slot extending between the first ear and the second ear.

In some aspects, the method can further comprise tightening the hinge pin to pinch the portion of the clamp between the first ear and the second ear and secure the baseplate relative to the clamp about the hinge pin. In some aspects, the baseplate can be a first baseplate, the brace assembly can be a first brace assembly, and the method can further comprise: sliding a slot of a second baseplate of a second brace assembly onto the rod through an open end of the second baseplate until the rod is positioned at a slot end of the slot of the second baseplate; and stacking the second baseplate on top of the first baseplate to interlock the second baseplate with the first baseplate and secure the second baseplate in a set orientation relative to the first baseplate about the rod.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A brace assembly comprising:
   a structural member comprising a sidewall; and
   a bracket comprising:
   a baseplate defining a narrowing slot extending from an open end to a closed end, at least one baseplate hinge hole extending through the baseplate at the open end;
   a clamp comprising a jaw member and a tightening member, the jaw member and the tightening member engaging the sidewall to couple the structural member to the bracket, the jaw member defining a clamp hinge hole; and
   a hinge pin extending across the open end and engaging the at least one baseplate hinge hole and the clamp hinge hole.

2. The brace assembly of claim 1, wherein:
   the jaw member defines a base, a jaw, and a tightening arm;
   the jaw and the tightening arm each protrude from the base; and
   a tightening screw threadedly engages the tightening arm.

3. The brace assembly of claim 2, wherein:
   a gap is defined between the jaw and the tightening arm; and
   the sidewall is positioned within the gap.

4. The brace assembly of claim 1, wherein:
   the baseplate defines an upper surface and a lower surface;
   the slot extends from the upper surface and the lower surface; and
   the slot narrows from the upper surface to the lower surface.

5. The brace assembly of claim 1, wherein the hinge pin is a bolt, and wherein the hinge pin threadedly engages a first base plate hinge hole of the at least one baseplate hinge hole.

6. The brace assembly of claim 1, wherein a portion of the jaw member is inserted into the slot.

7. The brace assembly of claim 1, wherein the slot defines a slot end where the slot terminates at the closed end of the baseplate, and wherein the slot end is a rounded end.

8. The brace assembly of claim 7, wherein:
   the rounded end defines an axis;
   the baseplate defines a countersink recessed into an upper surface of the baseplate; and
   the countersink is coaxially centered with the rounded end about the axis.

9. A brace assembly comprising:
   a structural member comprising a sidewall; and
   a bracket comprising:
   a baseplate defining an upper surface and a lower surface, the baseplate defining a slot narrowing from the upper surface to the lower surface and extending from an open end to a closed end of the baseplate, the baseplate defining at least one baseplate hinge hole at the open end;
   a clamp comprising a jaw member and a tightening member, the jaw member and the tightening member engaging the sidewall to couple the structural member to the bracket, the jaw member defining a clamp hinge hole; and
   a hinge pin engaging the at least one baseplate hinge hole and the clamp hinge hole.

10. A brace assembly comprising:
    a structural member comprising a sidewall; and
    a bracket comprising:
    a baseplate defining a slot extending from an open end to a closed end, the baseplate defining at least one baseplate hinge hole at the open end, the baseplate defines a countersink recessed into an upper surface of the baseplate, and the slot:
  defining a rounded slot end where the slot terminates at the closed end of the baseplate;
  the rounded slot end defines an axis; and
  the countersink is coaxially centered with the rounded slot end about the axis;
a clamp comprising a jaw member and a tightening member, the jaw member and the tightening member engaging the sidewall to couple the structural member to the bracket, the jaw member defining a clamp hinge hole; and
a hinge pin engaging the at least one baseplate hinge hole and the clamp hinge hole.

* * * * *